United States Patent
Matthews

(10) Patent No.: US 7,460,632 B2
(45) Date of Patent: Dec. 2, 2008

(54) CONTROL ROD ABSORBER STACK SUPPORT

(75) Inventor: Brett T. Matthews, Lynchburg, VA (US)

(73) Assignee: Areva NP Inc., Lynchburg, VA (US)

( * ) Notice: Subject to any disclaimer, the term of this patent is extended or adjusted under 35 U.S.C. 154(b) by 0 days.

(21) Appl. No.: 10/947,507

(22) Filed: Sep. 22, 2004

(65) Prior Publication Data

US 2006/0062344 A1 Mar. 23, 2006

(51) Int. Cl.
*G21C 7/00* (2006.01)
*G21C 11/00* (2006.01)

(52) U.S. Cl. .................. 376/327; 376/333; 376/209; 250/518.1; 250/517.1

(58) Field of Classification Search .................. 376/219, 376/220, 224, 339, 327, 333, 209; 176/86 R
See application file for complete search history.

(56) References Cited

U.S. PATENT DOCUMENTS

| | | | | |
|---|---|---|---|---|
| 3,423,324 A | * | 1/1969 | Best et al. | 252/301.4 F |
| 4,076,583 A | * | 2/1978 | Ash et al. | 376/230 |
| 4,139,414 A | * | 2/1979 | Giuggio et al. | 376/337 |
| 4,172,762 A | * | 10/1979 | Anthony et al. | 376/327 |
| 4,342,722 A | * | 8/1982 | Blum | 376/327 |
| 4,474,728 A | * | 10/1984 | Radford | 376/339 |
| 4,624,827 A | * | 11/1986 | Doshi et al. | 376/333 |
| 4,687,621 A | * | 8/1987 | Ferrari | 376/209 |
| 4,696,793 A | * | 9/1987 | Paul et al. | 376/447 |
| 4,728,487 A | * | 3/1988 | Cooney et al. | 376/327 |
| 4,820,478 A | * | 4/1989 | Freeman | 376/333 |
| 5,225,151 A | | 7/1993 | Bernander et al. | |
| 6,246,740 B1 | * | 6/2001 | Maruyama et al. | 376/327 |
| 6,636,580 B2 | * | 10/2003 | Murakami et al. | 376/333 |

FOREIGN PATENT DOCUMENTS

| | | |
|---|---|---|
| JP | 10282282 | 10/1998 |
| JP | 2000121769 | 4/2001 |
| JP | 2001108780 | 4/2001 |

OTHER PUBLICATIONS

McLain and Martens, Editors Reactor Hand book, vol. IV, Engineering, Jon Wiley & Sans, 1964.*

* cited by examiner

*Primary Examiner*—Jack W Keith
*Assistant Examiner*—Vadim Dudnikov
(74) *Attorney, Agent, or Firm*—Kenyon & Kenyon LLP

(57) ABSTRACT

An absorber rod for a nuclear reactor having a rod cladding defining an internal volume, the rod cladding having an upper end and a lower end, an upper end fitting positioned in the upper end of the rod cladding, a rod internal arrangement configured in the internal volume of the rod cladding, an absorber rod lower end cap positioned at the lower end of the rod cladding, the lower end cap having an upper surface and a lower surface, a stack support with a stack support upper end and a stack support lower end, the stack support lower end placed in contact with the upper surface of the lower end cap, the stack support upper end configured to support the rod internal arrangement, and an annulus of material configured around the stack support and contacting the upper surface of the lower end cap.

8 Claims, 1 Drawing Sheet

CONTROL ROD ABSORBER STACK SUPPORT

FIELD OF THE INVENTION

The current invention relates to control rod absorbers for nuclear power plants. More specifically, the current invention relates to a control rod absorber and associated stack support which may be used in a nuclear power plant for an extended time period and which minimally degrades from thermal creep.

BACKGROUND OF THE INVENTION

Pressurized water reactors (PWRs) use fuel assemblies which contain a nuclear fuel, such as enriched uranium dioxide, to produce a nuclear chain reaction. The nuclear chain reaction is moderated in several ways, including maintaining specific fuel enrichment levels, maintaining a specific geometry of the fissionable nuclear fuel assemblies, and placing absorber material through the nuclear reactor core.

The purpose of control rod absorbers is to slow or capture neutrons as the neutrons traverse the nuclear reactor. The absorber material allows sections of the core which potentially have greater amounts of nuclear activity to be reduced to more moderate levels. Because the control rod absorbers perform this task, the overall performance of the nuclear reactor is more consistent and the reactor is able to run with a greater degree of operational safety.

Over time, conventional control absorber rods start to degrade. This degradation leads to the sections of the core potentially becoming more radiologically active than other sections of the core. The degradation then leads to localized "hot spots" in the reactor core and may require nuclear power plant operators to limit overall reactor operation to maintain safe operating margins, thereby negatively impacting the economic operation of the facility. When the rods become severely degraded, the reactor cannot be safely operated, necessitating rod replacement. As these absorber assemblies which contain the rods are located in the reactor core itself, the absorber assembly replacement occurs during a reactor outage. The replacement of these absorber rods and assemblies must be performed very carefully as the materials themselves are highly radioactive after their residence in the reactor core. The removal of the assemblies from the core is performed remotely by use of a crane and the removal is therefore a difficult and expensive operation. Ultimate disposal of the highly radioactive components removed is also very expensive as such highly radioactive waste must be cooled with cooling water for a long period of time. The components may then be stored in a "dry" condition in a specially prepared cask with a gaseous cooled interior. All of these disposal costs increases the overall cost of operation of the facility.

Control rod assemblies may be provided in several various arrangements. "Black" clusters may be used in a reactor, wherein such "black" clusters are highly absorbent to neutrons traversing the nuclear reactor core. Other clusters, commonly known as "gray" clusters, may also be positioned around the reactor. The "gray" clusters are less absorbent than the "black" clusters and are therefore used in core positions that do not need as much radiation attenuation as other sections of the core. "Black" clusters are generally constituted of rods containing materials which are highly absorbent to neutrons, such as silver-indium-cadmium alloys.

Absorber rods and assemblies degrade through a variety of degradation mechanisms. Absorber rods made of silver-indium-cadmium alloys are subject to both creep and swelling under irradiation. Boron carbide alloy based absorber rods undergo a large amount of swelling under irradiation and as a result are not heavily used in portions of rods inserted into high activity core areas, such as the bottom of absorber rods. For this reason, silver-indium-cadmium alloys are primarily used in the bottom parts of control rods. For silver-indium-cadmium alloys, the chief degradation mechanism limiting operability is diametral expansion. Diametral expansion of rodlets is a result of irradiation-induced expansion, thermal creep and thermal expansion. The overall geometric shape of the absorber assembly causes degradation to occur most frequently at the lower tip of a rod because of a high fluence exposure and high stresses due to the force exerted from an internal absorber stack of the rod.

This is a need to produce a rod with absorber material which will limit diametral expansion.

This is also a need to produce an absorber rod which will have an increased service life in the nuclear core compared to conventional absorber rods and that will not have to be replaced as often as other absorber rod units.

There is also a need to produce an absorber rod assembly which will limit the amount of nuclear waste generated for a nuclear reactor.

SUMMARY

It is therefore an objective of the present invention to produce an absorber rod which will limit diametral expansion of rodlets in an absorber assembly.

It is also an objective of the present invention to produce an absorber rod which will be operable longer in the nuclear core and that will not have to be replaced as often as other absorber assembly units.

It is also an objective of the present invention to produce an absorber rod which will limit the amount of nuclear waste generated for a nuclear reactor.

The objectives of the present invention are achieved as shown and described. The invention provides an absorber rod for a nuclear reactor comprising a rod cladding defining in internal volume, the rod cladding having an upper end and a lower end, an upper end fitting positioned at the upper end of the rod cladding, a rod internal arrangement configured in the internal volume of the rod cladding, a lower end cap positioned at the lower end of the rod cladding, the lower end cap having an upper surface and a lower surface, a stack support with a stack support top end and a stack support bottom end, the stack support bottom end placed in contact with the upper surface of the lower end cap, the stack support top end configured to support the rod internal arrangement, and an annulus of material configured around the stack support and contacting the upper surface of the lower end cap.

The annulus of material may be made of a silver-indium-cadmium alloy and the cladding may be configured in a tube shape. The diameter of the absorber rod may be approximately 2.16 centimeters.

The stack support may be placed inside the annulus of material. The stack support rod may be configured to carry an entire weight of the rod internal arrangement and transport the entire weight to the lower end cap. The stack support top end may also be configured to have a larger outer perimeter than an outer perimeter of a body of the stack support.

The present invention also provides a stack support for a nuclear reactor absorber rod. The stack support comprises a stack support top end and a stack support bottom end, the stack support bottom end placed in contact with an upper surface of a lower end cap, the stack support top end configured to support a rod internal arrangement.

DETAILED DESCRIPTION

Figure 1:
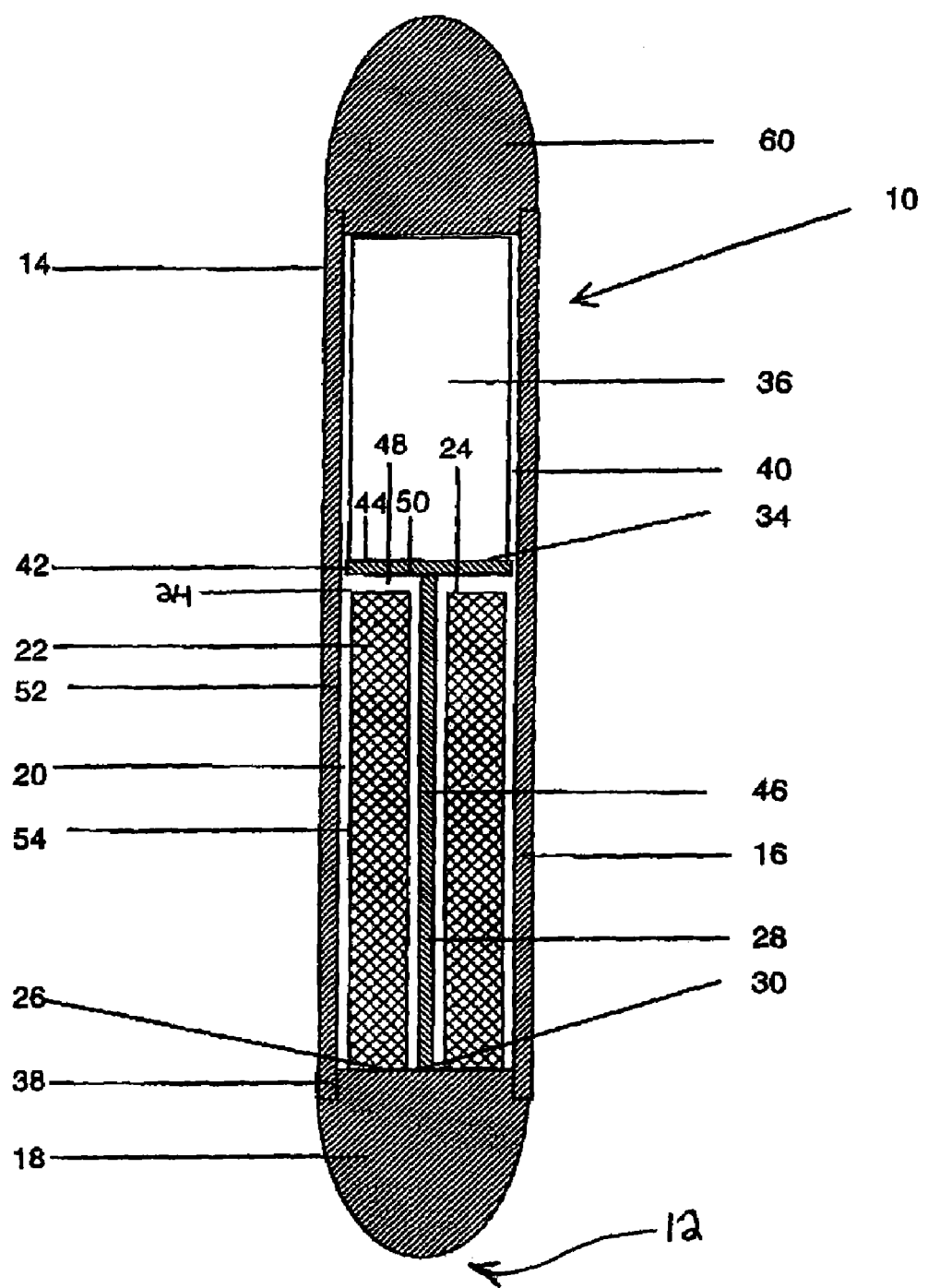
FIG. 1 is a cross-sectional view of an absorber rod stack support arrangement in conformance with the current invention.

Referring to FIG. 1, a control absorber rod 10 is illustrated in cross-sectional view. The control absorber rod may be part of a larger control rod assembly placed inside a nuclear reactor core. The control absorber rod 10 has an outer absorber cladding 16 which defines an interior volume. The cladding 16 is illustrated in a tubular arrangement, however other arrangements are possible and the illustrated arrangement in FIG. 1 is but one possibility. The cladding 16 is made of INCONEL® (high strength austenitic nickel-chromium-iron alloys) in the current illustrated embodiment, however other non-corrosive materials may be used such that corrosion products are not introduced into the reactor coolant stream if a corrosive environment is encountered. The thickness of the cladding 16 may be either constant or varied along the body of the cladding 16 to provide more or less protection to the internal components placed within the volume. In the illustrated embodiment, the thickness of the cladding is constant. The cladding 16 has an absorber rod upper end 14 and an absorber rod lower end cap 18. As illustrated, the absorber rod lower end cap 18 is configured such that the cladding 16 smoothly interfaces with the absorber rod lower end cap 18 at a connection 38. The connection 38 locks the respective side wall of the cladding together with the absorber rod lower end cap 18 such that the two pieces are not separable. The absorber rod lower end cap 18 is configured to limit hydraulic drag on the rod, thereby reducing overall pressure drop for the absorber rod 10. To this end, the absorber rod lower end cap 18 may have a rounded face wherein the fluid passing from a lower elevation to an upper elevation smoothly envelops the absorber rod 10. Other absorber rod lower end caps 18 may be configured with a cone shaped end or may be flat faced as non-limiting examples. The overall length of the absorber rod lower end cap 18 may also be configured such that the absorber rod may be lengthened to a desired amount, further limiting drag, if necessary. The overall width of an absorber rod 10 can be any size according to the needs of the reactor in which the absorber rod/assembly is placed. In the illustrated embodiment of the present invention, the diameter of the absorber rod 10 is approximately 2.41 centimeters. The control absorber rod 10 is also provided with an upper end filling 60, the upper end filling 60 sealing the upper end of the rod cladding 14.

The absorber rod cladding 16 defines an interior volume into which materials may be placed for either structural support or moderation of the nuclear reaction. To moderate the nuclear reaction, a rod internal arrangement 36 is provided to either capture or slow down neutrons as they traverse the nuclear reactor. The rod internal arrangement 36, as illustrated, is configured to fit within a top portion of the absorber rod cladding 16. The rod internal arrangement 36 is configured to be generally tubular in nature, however other configurations are possible. The rod internal arrangement 36, has an internal arrangement annulus 40 thereby providing a space between the rod internal arrangement 36 and the absorber rod cladding 16. The amount of space between the absorber rod cladding 16 and the rod internal arrangement 36 may be zero in the case of actual abutment between a part of the rod internal arrangement and the absorber rod cladding 16. The amount of space between the absorber rod cladding 16 and the rod internal arrangement 36 is be established such that if the rod internal arrangement 36 undergoes seismic acceleration in vertical, horizontal, or a combination of directions, contact between the rod internal arrangement 36 and the absorber rod cladding 16 is prevented or minimized as desired. The rod internal arrangement 36 is configured out of neutron absorbing material.

The absorber rod internal arrangement 36 is supported by a stack support 28. The purpose of the stack support 28 is to transfer the weight and/or forces on the rod internal arrangement 36 to the absorber rod lower end cap 18. The stack support 28 may simply support the absorber rod internal arrangement 36 or it may be connected to the absorber rod internal arrangement 36 such that in the event of a seismic event, such as when an upwards or lateral force is encountered, the rod internal arrangement 36 is maintained in a relatively consistent orientation and not allowed to impact the absorber rod cladding 16. The stack support 28 may be configured with an upper surface 34 and a stack support lower end 30. The stack support upper surface 34 provides the resting surface for the rod internal arrangement 36. The stack support upper surface 34, as illustrated, is configured in a circular configuration to fully support the rod internal arrangement 36. The thickness 42 of the stack support upper surface 34 is chosen such that the cantilever parts 44 of the stack support 28 do not deflect an appreciable amount, while providing the support capabilities needed during operational and accident loading conditions. The stack support 28 also is configured with a stem 46 which connects the stack support upper surface 34 with the stack support lower end 30. The stack support stem 46 is configured to allow the force transfer from the stack support upper surface 34 to the stack support lower end 30. The stack support stem 46 is designed such that bending of the stem 46 does not affect the operability of the absorber rod 10. The stack support lower end 30 is also designed such that the forces which are exerted upon the absorber rod lower end cap 18 do not punch through the absorber rod lower end cap 18 during any loading conditions. Although illustrated as a simple post end for the stack support lower end 30, the lower end 30 can be a flared unit, or may be countersunk into the absorber rod lower end cap 18 to provide a positive connection. The stack support 28 may be manufactured from high strength steel to provide sufficient support capacity for the rod internal arrangement 36. The materials may be stainless steel or other non-corrosive material to limit the effects of corrosion inside the absorber rod 10 and to limit galvanic corrosion from occurring.

A material annulus 22 may be positioned inside the absorber rod cladding 16 to allow for attenuation of the nuclear chain reaction at the lower end of the absorber rod 10. The material annulus 22 is positioned around the stem 46 and stack support lower end 30 to provide the absorber rod 10 with sufficient neutron absorber rod capacity. The material annulus 22 may be positioned in the interior volume of the absorber rod cladding 16 such that the material annulus bottom end 26 contacts the absorber rod lower end cap 18. The material annulus 22 is positioned underneath the cantilever portions 44 of the stack support 28 such that there is a gap 48 between the material annulus top end 24 and the bottom face of the stack support upper end 50. The size of the gap 48 between the bottom face 50 of the stack support upper end and the material annulus top end 24 may be minimized such that little to no gap 48 is present. The material annulus bottom end 26 may be countersunk into the absorber rod lower end cap 18. A locking arrangement may be established between the material annulus bottom end 26 and the absorber rod lower end cap 18 to eliminate the possibility for movement of the material annulus 22 inside the absorber rod cladding 16. The material annulus 22 may be additionally configured such that an annular space 20 is created around the material annulus 22. The annular space 20 may be varied such that a lesser or greater amount of space is provided between the interior wall 52 of the absorber rod cladding 16 and the exterior surface 54 of the material annulus 22.

The present invention solves problems associated with life-limiting considerations for control rods as a result of diametral expansion of the silver-indium-cadmium absorber. The present invention reduces the effect of thermal creep at the lower tip of the absorber stack which in turn lengthens the operable life-time of control rods.

The equation for strain rate due to thermal creep is as follows:

$$\epsilon' = K d^n \sigma^m \exp(-Q/RT)$$

where $\epsilon'$ is the axial creep strain rate measured in $s^{-1}$. The grain size of the material is provided in the variable (d), stress in $\sigma$ and temperature T. K, n, m and Q are material specific parameters. R is the universal gas constant. In the case of silver-indium-cadmium material, the parameter m has a value of approximately 1, therefore the creep strain rate is nearly linearly proportional to the stress of the material. By reducing the stress level of the material, the creep strain rate is also reduced.

The present invention provides a rod configuration which removes the forces exerted from plenum springs and internal stack weights from the lower portion of absorber material positioned inside an absorber rod. The forces exerted from the internals are transmitted through the stack support 28 to the absorber rod lower end cap 18. As a result, the load path bypasses the silver-indium-cadmium material annulus reducing the stress level of this component.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than in a restrictive sense.

What is claimed is:

1. An absorber rod for a nuclear reactor, comprising:
    a rod cladding defining an internal volume, the rod cladding having an upper end and a lower end;
    an upper end fitting positioned in the upper end of the rod cladding, the upper end fitting sealing the upper end of the rod cladding;
    a rod internal arrangement configured in the internal volume of the rod cladding, the rod internal arrangement made of a neutron absorbing material;
    an absorber rod lower end cap positioned at the lower end of the rod cladding, the lower end cap having an upper surface and a lower surface;
    a stack support made of a non-corrosive material and configured as a structural support, the stack support including a stack support upper end, a stack support lower end and an elongated stem connecting the stack support upper end to the stack support lower end, the stack support lower end placed in contact with the upper surface of the absorber rod lower end cap; and
    an annulus of material configured around the elongated stem and contacting the upper surface of the absorber rod lower end cap, the annulus of material made of a neutron absorbing material,
    wherein the stack support upper end supports the rod internal arrangement and separates the rod internal arrangement from the annulus of material, the load of the rod internal arrangement transferred through the elongated stem to the upper surface of the absorber rod lower end cap, the elongated stem extending through a center of the annulus of material.

2. The absorber rod according to claim 1, wherein the annulus of material is made of a silver-indium-cadmium alloy.

3. The absorber rod according to claim 1, wherein the cladding is configured in a tube shape.

4. The absorber rod according to claim 1, wherein an external surface of the rod cladding and an external surface of the lower end cap are flush where the rod cladding and lower end cap form a connection.

5. The absorber rod according to claim 1, wherein the stack support is configured to carry an entire weight of the rod internal arrangement and transport the entire weight to the lower end cap.

6. The absorber rod according to claim 1, wherein the stack support upper end is configured to have a larger outer perimeter than an outer perimeter of a stem of the stack support.

7. The absorber rod according to claim 1, wherein a diameter of the absorber rod is approximately 2.41 centimeters.

8. The stack support according to claim 1, wherein the stack support is made of a corrosion-resistant zirconium alloy.

* * * * *